UNITED STATES PATENT OFFICE

2,287,896
PRODUCTION OF ACYL AMINOSULPHONIC ACIDS

Henry Martin, Basel, Hans Heinrich Zaeslin, Riehen, near Basel, and Rudolf Hirt and Curt Glatthaar, Basel, Switzerland, assignors to the firm J. R. Geigy A. G., Basel, Switzerland No Drawing. Application November 24, 1939, Serial No. 306,028. In Switzerland December 19, 1938

5 Claims. (Cl. 260—507)

In our U. S. patent application Ser. No. 278,954 filed together with Alfred Staub on June 13, 1939, there is described a process for the production of halogen substituted acylaminosulphonic acids of the aromatic series, according to which aromatic aminosulphonic acids are combined with reactive carbonic acid or thiocarbonic acid derivatives to give acylaminosulphonic acids, in which the components are so chosen that at least one halogen-atom is present. For this purpose can, among other aminosulphonic acids, the halogenated aniline sulphonic acids such as 3:4-dichloroaniline-6-sulphonic acid and 3'-aminobenzoyl-3:4-dichloroaniline-6-sulphonic acid be used.

It has now been found that by replacement of the reactive carbonic acid or thiocarbonic acid derivatives by halogen substituted, araliphatic or aromatic carboxylic acids, or their functional derivatives, in the acylation of halogen substituted aminosulphonic acids of the benzene series, new valuable acyl amino sulphonic acids are obtained, which also possess to a high degree the property of protecting wool, feathers, hair, fur, textiles, etc. against damage by moths.

As example, the following compounds can be employed in the acylation of the halogen substituted aminosulphonic acids of the benzene series: The halogenide of the 2- or 4-halogen phenylacetic acid, of the 2- or 4-halogenbenzoic acid, or of the 2:4- or 3:4-dihalogenbenzoic acid. The corresponding ester or anhydride may also be used in place of the halogenide.

The following examples illustrate the invention, the parts being by weight, where nothing other is said.

Example 1

14.5 parts of 3:4-dichloroaniline-6-sulphonic acid are dissolved in 150 parts of water by the aid of the necessary amount of sodium carbonate, 50 parts by volume of diethylaniline are added and 18 parts of p-chlorobenzoyl-chloride dropped in, the mixture being warmed for 3 hours to 30-40° C. The acyl compound is filtered and distilled with steam until all the diethylaniline is removed, when the residue is cooled and acidified. It is filtered off and the sodium salt formed by neutralisation.

The obtained compound has the following formula:

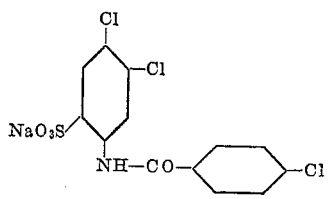

If in the above example the p-chlorobenzoyl-chloride is replaced by 3:4-dichlorobenzoylchloride, a compound possessing similar properties, is obtained.

The obtained compound has the following formula:

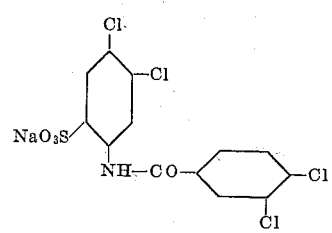

Example 2

18 parts of 3'-aminobenzoyl-3:4-dichloroaniline-6-sulphonic acid are dissolved in 100 parts by volume of dry pyridine and, under stirring, and cooling with ice-water, treated with 10 parts of p-chloro-phenylacetyl chloride in small portions. The mixture is stirred for a further 5 hours at room temperature, warmed for 1 hour to 50-60° C., treated with a sodium carbonate solution and steam distilled until all the pyridine has been removed. The acyl compound is precipitated as a resin by a common salt solution, and after decanting the aqueous solution is dried in a vacuo, giving a brittle, brown mass.

The obtained compound has the following formula:

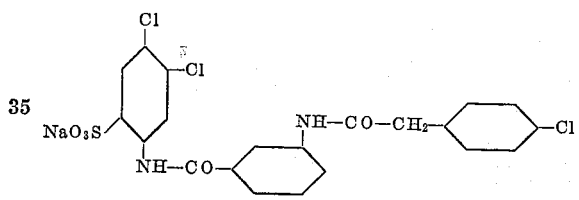

By using 4'-aminobenzoyl-3:4-dichloroaniline-6-sulphonic acid in the above example, the corresponding compound

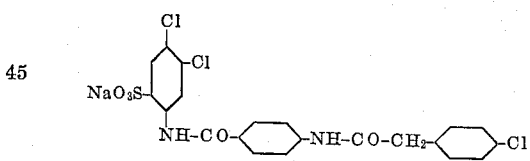

is obtained.

Instead of p-chloro-phenylacetyl chloride may be used the bromide or also mono- or dichloro- or bromo-benzoyl-halides.

The treatment of textiles with the improved products can be performed for example as follows:

(a) Wool or wool containing fabrics are treated at boiling temperature for 45 minutes to 1 hour with a solution of 0.3 to 0.6% of one of the compounds according to Examples 1 and 2 (calculated on wool), 3 to 5% of sulphuric acid and 10% of crystalline Glauber's salt, then the goods are rinsed and dried, or (b) Wool is treated at 60° C. for 45 minutes with a solution of 0.3 to 0.6% of the above mentioned compounds and 10 to 20% of crystalline Glauber's salt, then it is rinsed and dried.

What we claim is:

1. Acyl-aminosulphonic acids of the formula

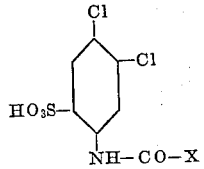

wherein X stands for a member of the group consisting of the halogen-substituted benzyl and benzene radicals, said acids possessing marked moth-proofing properties.

2. Acyl-aminosulphonic acids of the formula

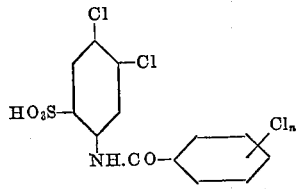

wherein $n$ represents one of the integers 1 and 2, said acids possessing marked moth-proofing properties.

3. The acyl-aminosulphonic acid having the following formula

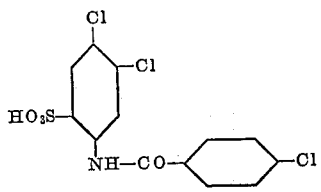

said acid possessing marked moth-proofing properties.

4. The acyl-aminosulphonic acid having the following formula

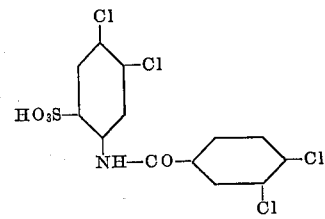

said acid possessing marked moth-proofing properties.

5. The acyl-aminosulphonic acid having the following formula

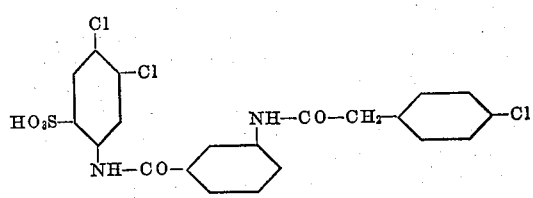

said acid possessing marked moth-proofing properties.

HENRY MARTIN.
HANS HEINRICH ZAESLIN.
RUDOLF HIRT.
CURT GLATTHAAR.